US011314577B2

(12) United States Patent
Yu et al.

(10) Patent No.: US 11,314,577 B2
(45) Date of Patent: Apr. 26, 2022

(54) SYSTEM AND METHOD FOR CONSTRUCTING FAULT-AUGMENTED SYSTEM MODEL FOR ROOT CAUSE ANALYSIS OF FAULTS IN MANUFACTURING SYSTEMS

(71) Applicant: Palo Alto Research Center Incorporated, Palo Alto, CA (US)

(72) Inventors: Hong Yu, San Jose, CA (US); Ajay Raghavan, Mountain View, CA (US); Saman Mostafavi, San Francisco, CA (US); Deokwoo Jung, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/068,613

(22) Filed: Oct. 12, 2020

(65) Prior Publication Data

US 2022/0035694 A1 Feb. 3, 2022

Related U.S. Application Data

(60) Provisional application No. 63/060,522, filed on Aug. 3, 2020.

(51) Int. Cl.
*G06F 11/00* (2006.01)
*G06F 11/07* (2006.01)
(Continued)

(52) U.S. Cl.
CPC .......... *G06F 11/079* (2013.01); *G06F 11/261* (2013.01); *G06F 11/3006* (2013.01);
(Continued)

(58) Field of Classification Search
CPC .. G06F 11/008; G06F 11/079; G06F 11/0793; G06F 11/3476
See application file for complete search history.

(56) References Cited

U.S. PATENT DOCUMENTS 9,537,720 B1 * 1/2017 Baggott ................ H04L 41/065
10,474,519 B2 * 11/2019 Talwadker .......... H04L 41/0645
(Continued)

OTHER PUBLICATIONS

Nguyen Dang Trinh et al: "Fault Diagnosis for the complex manufacturing system", Institution of Mechanical Engineers Proceedings. Part O: Journal of Risk and Reliability, vol. 230, No. 2, Apr. 1, 2016, pp. 178-194, XP055870496, UK, ISSN: 1748-006X, DOI: 10.1177/1748006X15623089 URL: https://www.researchgate.net/profile/Muhammad-Shahzad-19/publication/281743026_Fault_diagnosis_for_the_complex_manufacturing_system/links/56598de808aefe619b22c533/.

*Primary Examiner* — Charles Ehne
(74) *Attorney, Agent, or Firm* — Shun Yao; Yao Legal Services, Inc.

(57) ABSTRACT

A system is provided for determining causes of faults in a manufacturing system. The system stores data associated with a processing system which includes machines and associated processes, wherein the data includes timestamp information, machine status information, and product-batch information. The system determines, based on the data, a topology of the processing system, wherein the topology indicates flows of outputs between the machines as part of the processes. The system determines information of machine faults in association with the topology. The system generates, based on the machine-fault information, one or more fault parameters which indicates frequency and severity of a respective fault. The system constructs, based on the topology and the machine-fault information, a system model
(Continued)

which includes the one or more fault parameters, thereby facilitating diagnosis of the processing system.

20 Claims, 15 Drawing Sheets

(51) Int. Cl.
  *G06F 11/26* (2006.01)
  *G06F 11/32* (2006.01)
  *G06F 11/30* (2006.01)

(52) U.S. Cl.
  CPC ........ *G06F 11/3075* (2013.01); *G06F 11/321* (2013.01); *G06F 11/327* (2013.01)

(56) References Cited

U.S. PATENT DOCUMENTS

| | | |
|---|---|---|
| 2010/0198776 A1 | 8/2010 | Wang et al. |
| 2016/0203036 A1* | 7/2016 | Mezic .................. G06F 11/079 714/819 |
| 2017/0193143 A1 | 7/2017 | Saha et al. |
| 2017/0242758 A1* | 8/2017 | Chou .................. G06F 9/45558 |

* cited by examiner

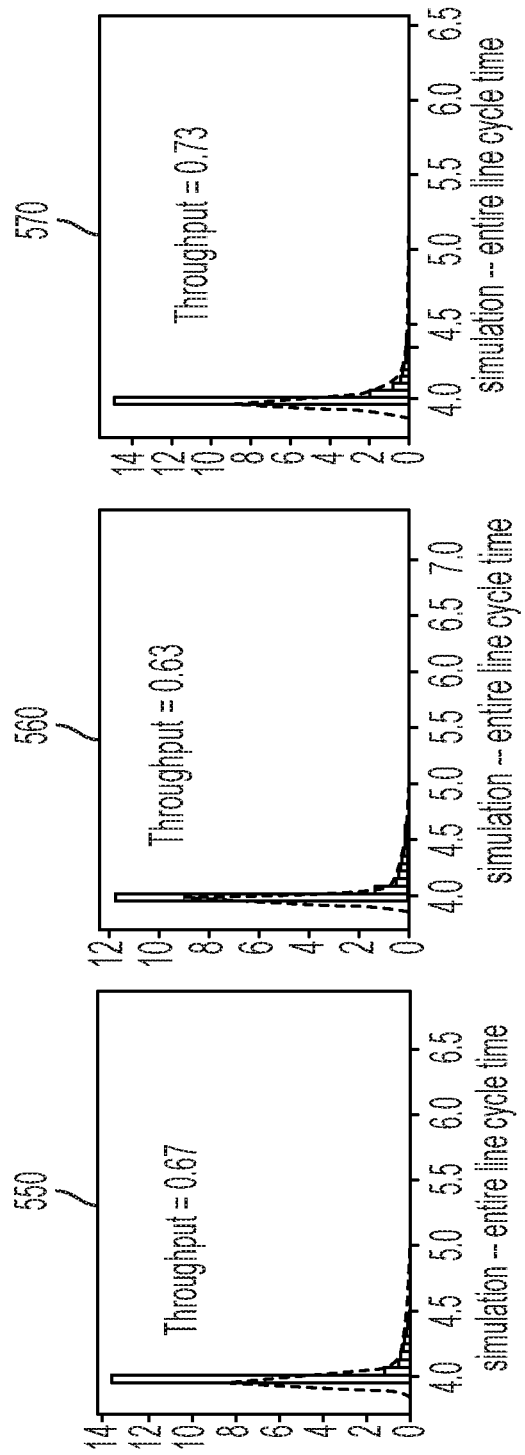

SYSTEM AND METHOD FOR CONSTRUCTING FAULT-AUGMENTED SYSTEM MODEL FOR ROOT CAUSE ANALYSIS OF FAULTS IN MANUFACTURING SYSTEMS

RELATED APPLICATIONS

This application claims the benefit of U.S. Provisional Application No. 63/060,522, titled "System and Method for Constructing Fault-Augmented System Model for Root Cause Analysis of Faults in Manufacturing Systems," by inventors Hong Yu, Ajay Raghavan, Saman Mostafavi, and Deokwoo Jung, filed on 3 Aug. 2020, the disclosure of which is incorporated herein by reference in its entirety.

This application is related to U.S. application Ser. No. 17/061,248, entitled "System and Method for Determining Manufacturing Plant Topology and Fault Propagation Information," by inventors Hong Yu, Ajay Raghavan, Deokwoo Jung, and Saman Mostafavi, filed 1 Oct. 2020 (hereinafter "U.S. patent application Ser. No. 17/061,248"), which application claims the benefit of:

U.S. Provisional Application No. 63/059,446, titled "System and Method for Determining Manufacturing Plant Topology and Fault Propagation Information," by inventors Hong Yu, Ajay Raghavan, Deokwoo Jung, and Saman Mostafavi, filed on 31 Jul. 2020, the disclosures of which are incorporated herein by reference in their entirety.

BACKGROUND

Field

This disclosure is generally related to data mining. More specifically, this disclosure is related to a system and method for constructing a fault-augmented system model for root cause analysis of faults in manufacturing systems.

Related Art

In modern manufacturing (such as cyber physical manufacturing systems), the network can be dynamic, with machines configured into clusters to suit the changing demands of production. Fault detection and root cause analysis (RCA) of unplanned machine stops and production line performance drops can have tremendous economic value. While model-based anomaly detection/fault diagnosis approaches may require knowledge of the nominal process model, a model-based root cause analysis (RCA) can require not only that but also a system capable of extrapolating the process beyond the nominal process in order to deduct causal relations between faults. The order of complexity of cyber physical manufacturing systems can make it infeasible to manually construct the system model, and the addition of fault modeling may result in extra complexity.

Current RCA approaches for manufacturing systems can generally be divided into two categories: data-driven approaches; and model-based approaches. The recent advancement of machine learning and big data technology has opened the door for extracting information for RCA purposes by mining manufacturing data. Two popular data-driven approaches include association rule extraction and Bayesian networks. In contrast, model-based approaches attempt to utilize knowledge about the system and/or physics of a failure. A model-based approach can be based on first principles (such as finite element models) or based on state space modeling (such as automata machines), i.e., a physics-based model. However, the level of detail required for such a physics-model based approach may render it feasible for only a small subset of engineering systems where the cost of collecting labeled data for data-driven approaches outweighs the cost of building such models.

Thus, while some current approaches for determining RCA in manufacturing systems may use model-based approaches to utilize knowledge about a manufacturing system and/or physics of a failure, these approaches may be constrained by a limited amount of labeled data.

SUMMARY

One embodiment provides a system for determining causes of faults in a manufacturing system. During operation, the system stores data associated with a processing system which includes machines and associated processes, wherein the data includes timestamp information, machine status information, and product-batch information. The system determines, based on the data, a topology of the processing system, wherein the topology indicates flows of outputs between the machines as part of the processes. The system determines information of machine faults in association with the topology. The system generates, based on the machine-fault information, one or more fault parameters which indicates frequency and severity of a respective fault. The system constructs, based on the topology and the machine-fault information, a system model which includes the one or more fault parameters, thereby facilitating diagnosis of the processing system.

In some embodiments, the system categorizes the machines and the machine faults into a number of types based on the frequency and the severity of a respective machine fault. The system simulates a plurality of failure scenarios by changing the one or more fault parameters in the system model. The system determines a set of fault propagation rules based on the simulated failure scenarios.

In some embodiments, the system generates a fault causality graph based on the topology and the machine-fault information. The system prunes the fault causality graph based on the system model. The system determines a causality relation between failures of the machines and system-level performance degradation. The system adds, based on the causality relation, a causality link to the pruned fault causality graph to obtain a combined causality graph.

In some embodiments, the system displays the fault causality graph, wherein a respective node in the fault causality graph indicates, for a respective output, a first machine which processes the respective output, a first process associated with the first machine, and a stopcode indicating an issue associated with the first machine and the first process in processing the respective output, and wherein a respective edge in the fault causality graph indicates, for the respective output, a logical flow from an originating node to a destination node.

In some embodiments, the system prunes the fault causality graph based on the system model by reducing a size of the fault causality graph by removing one or more nodes from the fault causality graph, and the system displays the pruned fault causality graph.

In some embodiments, in response to adding the causality link to the pruned fault causality graph, the system displays the combined causality graph, which allows a user to perform efficient fault diagnosis of the processing system.

In some embodiments, a respective fault parameter includes one or more of: a mean time between failures, which indicates an average time between two consecutive breakdowns of a respective machine, wherein a respective breakdown is a random event generated from a first distribution; a first standard deviation in a failure, which indicates a standard deviation of the first distribution which represents the respective breakdown; a mean time to recover, which indicates an average time for a machine to recover from a stopped state, wherein a random recovery time is generated from a second distribution; and a second standard deviation in a recovery, which indicates a standard deviation of the second distribution which represents the recovery time.

In some embodiments, the system constructs the system model which includes the one or more fault parameters by replacing nodes in the topology with machine models to obtain a fault-augmented model, wherein a respective machine is indicated by a finite state machine with states including busy, available, and stopped.

In some embodiments, the system determines, based on the topology, normal operation parameters, including one or more of: a process time, which indicates a first total time involved for a machine to process a respective output or a second total time involved for all machines in a process to process a respective output; a standard deviation in the process time; and a data structure, which indicates the outputs which a respective machine can process.

In some embodiments, the processing system comprises one or more of: a manufacturing system, wherein the network topology further indicates flows of materials between the machines as part of the processes; a cloud or cluster computing system, wherein the network topology further indicates flows of distributed or parallel computations or simulations associated with outputs between the machines as part of the processes of the cloud or cluster computing system; and a supply chain system, wherein the network topology further indicates flows of materials associated with delivery and distribution outputs between the machines as part of the processes of the supply chain system.

BRIEF DESCRIPTION OF THE FIGURES

FIG. 5C illustrates an exemplary diagram of a throughput given an increase in failures of a first process, in accordance with an embodiment of the present application.

FIG. 5D illustrates an exemplary diagram of a throughput given an increase in failures of a second process, in accordance with an embodiment of the present application.

FIG. 5E illustrates an exemplary diagram of a throughput given an increase in failures of a third process, in accordance with an embodiment of the present application.

DETAILED DESCRIPTION

Figure 1A:
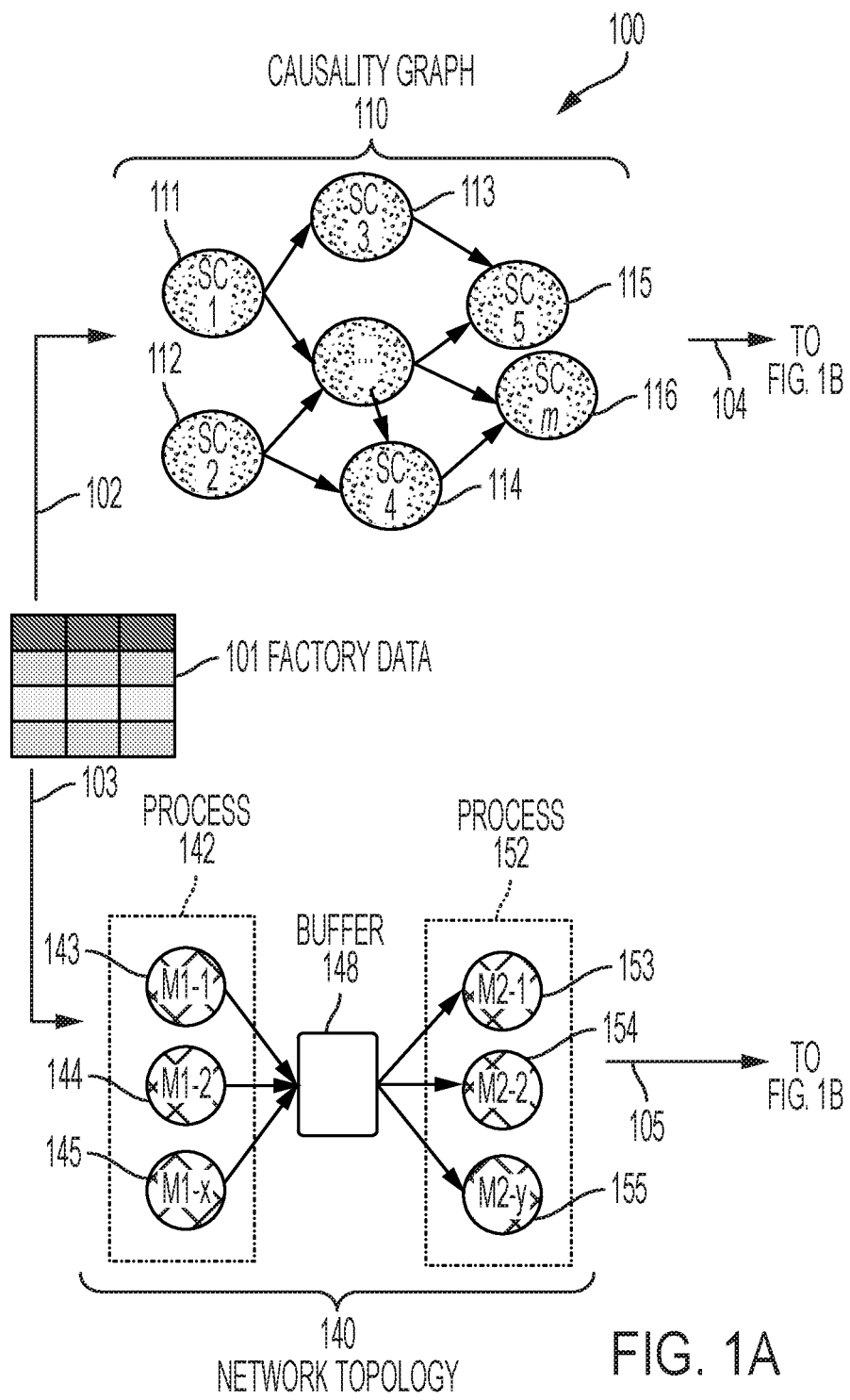
FIG. 1A illustrates an exemplary architecture for determining causes of faults in a manufacturing system, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which constructs a system model using learned models from data and further enriches the model with fault characteristics for fault diagnosis and root cause analysis (RCA).

As described above, in modern manufacturing (e.g., cyber physical manufacturing systems), the network can be dynamic, with machines configured into clusters to suit the changing demands of production. Fault detection and root cause analysis (RCA) of unplanned machine stops and production line performance drops can be tremendous economic value. While model-based anomaly detection/fault diagnosis approaches may require knowledge of the nominal process model, a model-based root cause analysis (RCA) can require not only that but also a system capable of extrapolating the process beyond the nominal process in order to deduct causal relations between faults. The order of complexity of cyber physical manufacturing systems can make it infeasible to manually construct the system model, and the addition of fault modeling may result in extra complexity.

Current RCA approaches for manufacturing systems can generally be divided into two categories: data-driven approaches; and model-based approaches. The recent advancement of machine learning and big data technology has opened the door for extracting information for RCA purposes by mining manufacturing data. Two popular data-driven approaches include association rule extraction and Bayesian networks. In contrast, model-based approaches, attempt to utilize knowledge about the system and/or physics of a failure. A model-based approach can be first principle based (such as finite element models) or based on state space modeling (such as automata machines), i.e., a physics-based model. However, the level of detail required for such a physics-model based approach may render it feasible for only a small subset of engineering systems where the cost of collecting labeled data for data-driven approaches outweighs the cost of building such models.

Thus, while some current approaches for determining RCA in manufacturing systems may use model-based approaches to utilize knowledge about a manufacturing system and/or physics of a failure, these approaches may be constrained by a limited amount of labeled data.

The embodiments described herein addresses this constraint by providing a system which facilitates construction of a manufacturing system model based on learned models from data, and enriching the manufacturing system model with fault characteristics for root cause analysis. The described system can construct physical topology-based system models by using parameterized fault models, and can also detect changes in production line topology and reconfigure the system model accordingly.

Machine faults can be represented by parameters which describe both the frequency and the severity of faults. These fault parameters can be learned in an automated manner from manufacturing logs (e.g., log data). Thus, the constructed model can be not only capable of simulating faults at the machine level, but can also replicate faults at the process level where single machines in the process line may not necessarily show faulty symptoms.

Determining a manufacturing plant topology and fault propagation information using a data-driven approach (e.g., by analyzing data/statistics found in manufacturing log data) is described in U.S. patent application Ser. No. 17/061,248. The described embodiments can provide an enhanced approach by constructing a system model which can be used to simulate fault scenarios. Specifically, the system can use a hybrid data-driven and fault-augmented model-based approach for RCA. Using a data-driven approach, the system can generate a causality graph. Using a model-based approach, the system can prune the causality graph and add causality links which are generated by fault scenario simulations. An exemplary architecture which facilitates determining causes of faults in a manufacturing system using this hybrid approach is described below in relation to FIGS. 1A, 1B, 1C, and 7.

This hybrid approach can result in striking a balance between the computational demand and the level of detail required to perform anomaly detection tasks. Furthermore, using the models can be viewed as an object-oriented approach, which can allow multiple components of a smart factory to be robustly described in a modular, extendable, and reconfigurable manner. The embodiments described herein provide a system which can decrease the amount of analysis time required during a downtime, which can result in a more improved and efficient system, both for an individual production line and across all production lines in a manufacturing system.

Thus, the described embodiments provide a system for fault diagnosis which addresses the challenges of using only data-driven approaches or model-based approaches to analyzing and determining causes of faults in a manufacturing system. By using a hybrid approach which includes both a data-driven approach and a model-based approach, the described embodiments can address the constraints involved in exclusively using one of these approaches (e.g., by eliminating the need for a costly large amount of labeled data).

The terms "originating node" and "destination node" refer to a pair of nodes where materials flow, as indicated via a directed edge, from the originating node to the destination node. For example, materials of with a same lot number may flow from a first machine as part of first process (originating node) to a second machine as part of a second process (destination node), as described below in relation to FIGS. 1A, 1B, 1C, and 6.

The term "product-batch information" refers to information, such as a lot number, which can indicate or identify materials, products, or other components processed by machines as part of processes in a manufacturing system.

A "stop event" refers to an unplanned event which causes a manufacturing system to stop for a period of time. A "stopcode" refers to an identifier of an issue associated with a machine or a process in a manufacturing system, and may be (but is not necessarily) associated with a stop event.

The term "machine status information" refers to a condition of a given machine, and can include a stopcode, a fault type, or other indicator or identifier of a stop event.

The term "buffer" refers to a physical buffer or physical bin in which materials may be held for a period of time between machines/processes. The period of time may depend on human-related factors (e.g., when a change of personnel may occur or if the material must be manually moved from one machine to another) or system-related factors (e.g., the performance and usage of machines downstream from or subsequent to a given machine).

The term "machine-fault information" refers to information (including statistics relating to time to failure and time to recover) of machine faults in association with a topology, e.g., a manufacturing network topology.

The terms "topology" and "network topology" are used interchangeably in this disclosure and refer to a description of how machines/processes of a processing system (e.g., a manufacturing system) are connected, both physically and logically.

The term "causality graph" refers to fault propagation paths, as described below in relation to FIG. 1A. A "pruned causality graph" refers to a causality graph with nodes which have been removed due to a determination that certain links/nodes do not physically need to be included in the causality graph, as described below in relation to FIG. 1B. A "combined" or "final combined" causality graph refers to a pruned causality graph to which determined causality links have been added, where a causality link indicates a relation between machine failures and system-level performance degradation, as described below in relation to FIG. 1C.

The term "processing system" refers to a system with machines or entities which perform processes resulting in outputs, where those outputs are used as inputs to a next machine or entity as part of a flow, through the processing system, of a respective output from a beginning to an end of the flow. In this disclosure, a manufacturing system, manufacturing log data, and a manufacturing network topology are depicted for purposes of illustration. The described system can include other processing systems, including, but not limited to: distributed parallel computations/simulations in a cloud/cluster computing system or facility; and a delivery/distribution supply chain.

The term "output" refers to a logical or physical unit or product which can be processed by a machine, e.g., an object, a machine part, a material, a unit, or a component. An output can also refer to a material output or other result derived by a machine or entity performing process upon the material or output. An output can comprise a physical material or the result of a calculation or simulation.

Figure 1B:
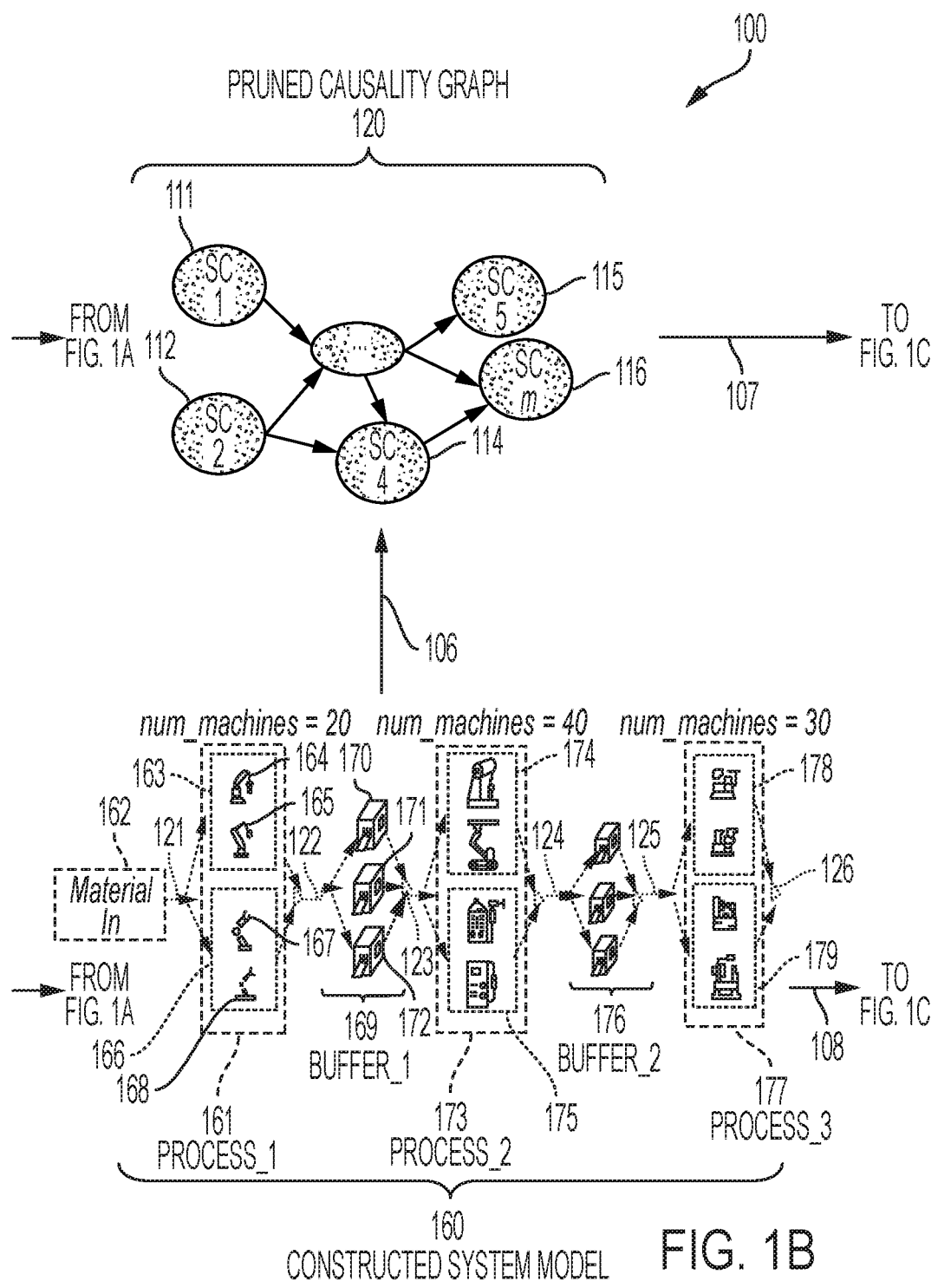
FIG. 1B illustrates an exemplary architecture for determining causes of faults in a manufacturing system, in accordance with an embodiment of the present application.
Figure 1C:
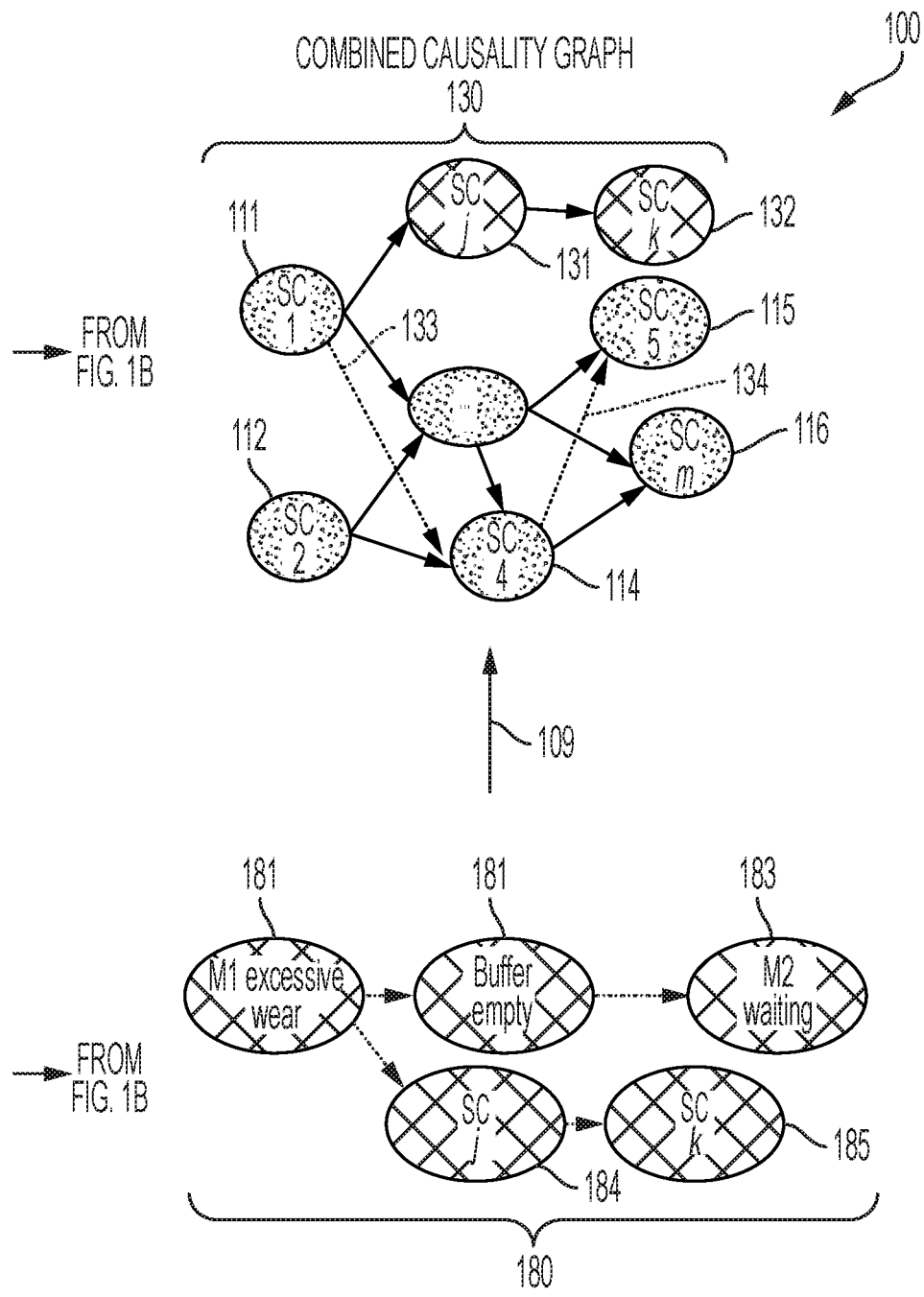
FIG. 1C illustrates an exemplary architecture for determining causes of faults in a manufacturing system, in accordance with an embodiment of the present application.

Exemplary Environment for Determining Causes of Faults in a Manufacturing System FIGS. 1A, 1B, and 1C illustrate an exemplary architecture 100 for determining causes of faults in a manufacturing system, in accordance with an embodiment of the present application. Architecture 100 depicts a hybrid approach using both a data-driven approach and a model-based approach. Architecture 100 can include: factory data 101; a causality graph 110; a pruned causality graph 120; a combined causality graph 130; a network topology 140; a constructed system model 160; and a fault propagation tree 180. The top half or branch of architecture 100 (with causality graph 110, pruned causality graph 120, and combined causality graph 130) represents the pipeline for the data-driven approach, while the bottom half or branch of architecture 100 (with network topology 140, constructed system model 160, and fault propagation tree 180) represents the pipeline for the model-based approach. The two branches can be tightly connected, as described herein.

Network Topology, Causality Graph, and System Model

During operation, as shown in FIG. 1A, the system can store factory data 101, e.g., manufacturing log data or data associated with a manufacturing system which includes machines and associated processes. Factory data 101 can include timestamp information, machine status information, and product-batch information. The system can determine network topology 140 based on factory data 101, e.g., by extracting topology information from the manufacturing log data or factory data 101 (via an operation 103, and as described in U.S. patent application Ser. No. 17/061,248). Network topology 140 can correspond to the manufacturing system and can indicate flows of objects (e.g., materials, products, or units in a production line or manufacturing system) between the machines as part of the processes of the manufacturing system. Network topology 140 can indicate processes 142 and 152, where each process has multiple associated machines. Process 142 can include machines M1-1 143, M1-2 144, and M1-$x$ 145, while process 152 can include machines M2-1 153, M2-2 154, and M2-$y$ 155.

Network topology 140 can also include physical buffers (such as a physical bin) in which materials may be placed for a certain period of time after being processed by one machine and prior to being processed by the next machine. For example, materials can flow from being processed by machine M1-1 143 of process 142, to a buffer 148 for a period of time, and to being processed by machine M2-2 154 of process 152.

Using factory data 101, the system can also generate causality graph 110, which can include fault propagation paths (via an operation 102). Causality graph 110 can include nodes which indicate, for a respective object or material, a machine which processes a respective object, a process associated with the machine, and a stopcode associated processing the object by machine/process. Causality graph 110 depicts stopcodes only, without the corresponding machine/process information, for purposes of illustration. For example: a node 111 can correspond to stopcode ("SC") 1; a node 112 can correspond to SC 2; a node 113 can correspond to SC 3; a node 114 can correspond to SC 4; a node 115 can correspond to SC 5; and a node 116 can correspond to SC m. The edges between nodes in causality graph 110 indicate a logical flow of the object from an originating node to a destination node. Fault propagation paths are described in U.S. patent application Ser. No. 17/061,248. The system can determine information of machine faults in association with network topology 140, and can generate fault parameters which indicate the frequency and severity of a respective machine fault. Building causality graph 110 can be based on using machine learning or statics analysis techniques, such as Bayesian networks and Granger's causality test.

As shown in FIG. 1, the system can generate constructed system model 160 based on network topology 140 and the machine-fault information (via, e.g., an operation 105). System model 160 can represent a fault-augmented system model. Recall that manufacturing log data (e.g., factory data 101) can include rich information about the status of the machines (i.e., machine status information). Factory data 101 can include timestamp information associated with machine stops and resume-from-stops. The system can extract the duration of faults and the time taken to recover from the faults (e.g., the "time to recover"). The system can model the faults or failures based on several statistical characteristics (i.e., "fault parameters") which describe or indicate the frequency and severity of a respective fault.

These parameters include: a mean time between (or to) failures (MTTF), which indicates an average time between two consecutive breakdowns of a respective machine, wherein a respective breakdown is a random event generated from a first distribution; a first standard deviation in a failure, which indicates a standard deviation of the first distribution which represents the respective breakdown; a mean time to recover (MTTR), which indicates an average time for a machine to recover from a stopped state, wherein a random recovery time is generated from a second distribution; and a second standard deviation in a recovery, which indicates a standard deviation of the second distribution which represents the recovery time. The first and the second distribution can be, e.g., a Gaussian distribution or another distribution.

Exemplary Fault Augmentation Based on Machine Scenarios

Figure 2:
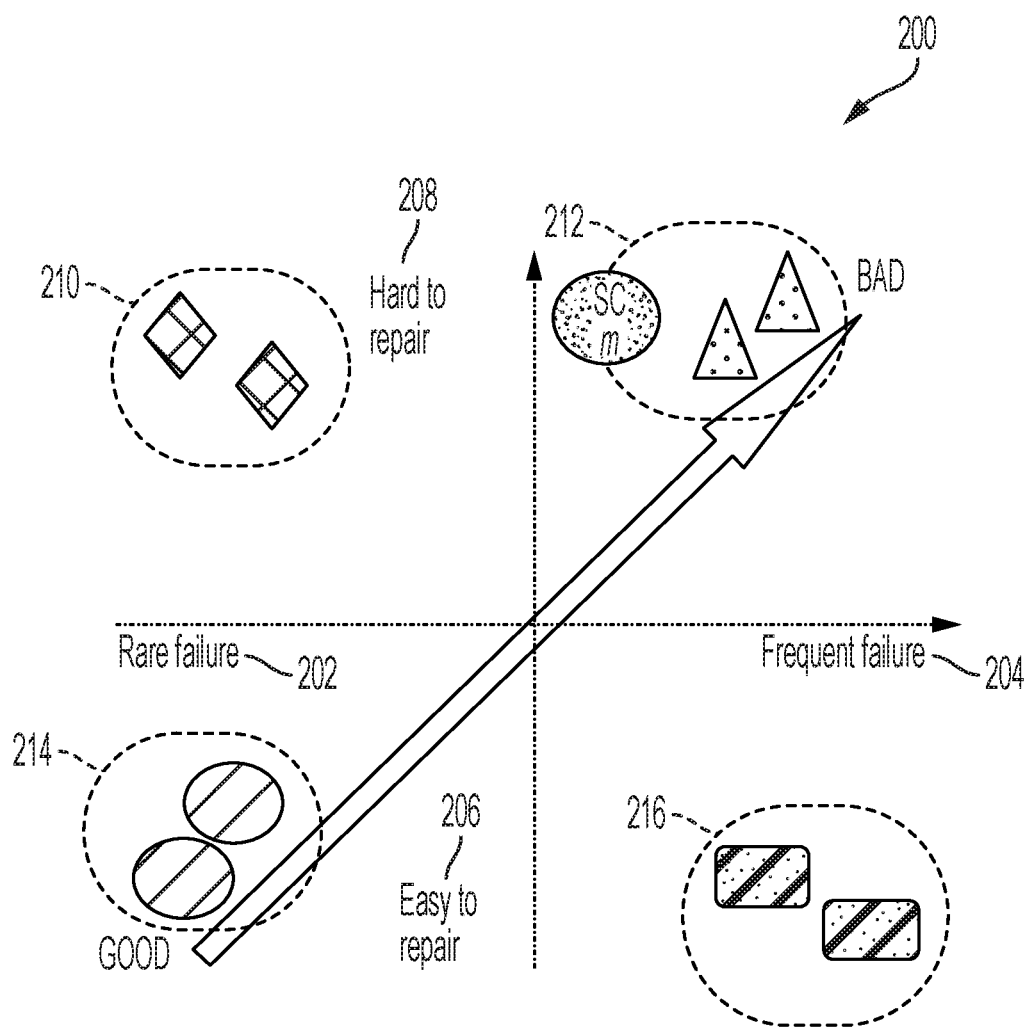
FIG. 2 illustrates a diagram of machine faults based on severity and frequency of faults, in accordance with an embodiment of the present application.

FIG. 2 illustrates a diagram 200 of machine faults based on severity and frequency of faults, in accordance with an embodiment of the present application. In diagram 200, the x-axis can correspond to the frequency of failures, e.g., beginning from a rare failure 202 on the left side to a frequent failure 204 on the right side. The y-axis can correspond to the severity of failures, e.g., beginning from an easy to repair 206 on the bottom to a hard to repair 208 on the top.

The system can categorize the machines and machine faults into a number of types based on the frequency and the severity of a respective machine fault. For example, in diagram 200, four clear types are indicated, one in each quadrant. A "Type 1" 212 is prone to fail (frequent failure) and may be difficult to repair (hard to repair). A "Type 2" 210 is not prone to fail (rare failure) but may be difficult to repair (hard to repair). A "Type 3" 214 is not prone to fail (rare failure) and is easy to repair. A "Type 4" 216 is prone to fail (frequent failure) but is easy to repair. Thus, the diagonal arrow moving from the Type 3 214 faults to the Type 1 212 faults indicates moving from "Good" to "Bad" faults, measured in terms of frequency and severity. While diagram 200 describes only four categories for types of machine faults, any number of categories may be used.

Figure 3:
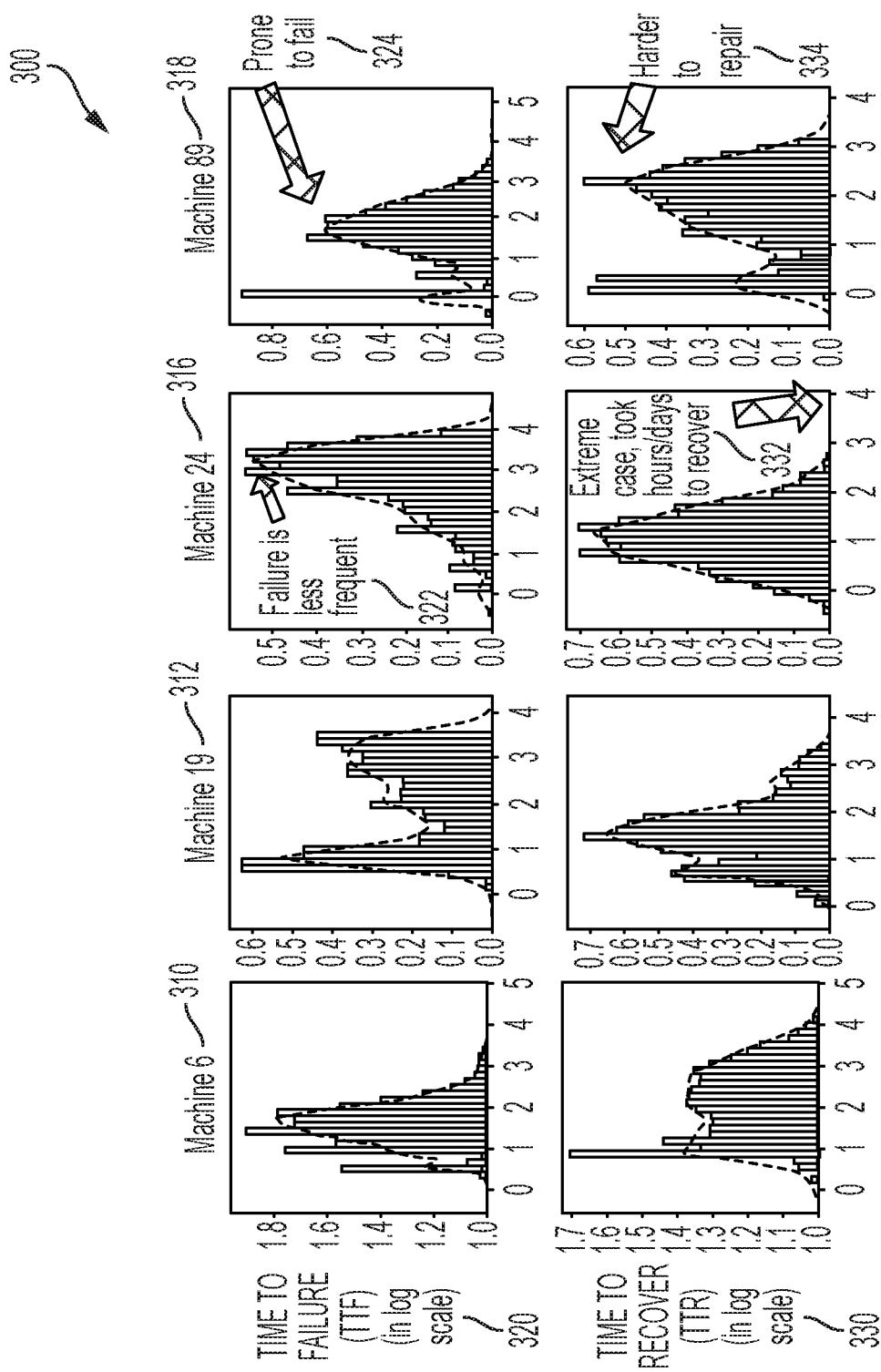
FIG. 3 illustrates a diagram indicating exemplary types of machines based on fault characteristics, including time to failure and time to recovery, in accordance with an embodiment of the present application.

FIG. 3 illustrates a diagram 300 indicating exemplary types of machines based on fault characteristics, including time to failure and time to recovery, in accordance with an embodiment of the present application. Diagram 300 can include graphs which indicate a time to failure (TTF) 320 (in log scale) and a time to recover (TTR) 330 (in log scale) for the following four machines: a machine 6 310; a machine 19 312; a machine 24 316; and a machine 89 318. In the TTF graph for machine 24 316, the TTF is high, which means that a failure is less frequent (322) for this machine. In contrast, in the TTF graph for machine 89 318, the TTF is low, which means that the machine is prone to fail (324) or experience a higher frequency of failure.

In the TTR graph for machine 24 316, the tail end of the TTR is high, as this indicates an extreme case, which took hours/days to recover (332). In the TTR graph for machine 89 318, the TTR is also high, which indicates that the machine is harder to repair (334).

Constructed System Model (Fault-Augmented System Model)

Returning to FIG. 1B, in generating system model 160, the system can replace the nodes of network topology 140 with a fault-augmented machine model (i.e., system model 160). This model can be implemented using, e.g., Modelica, and can indicate the connections between machines and identify a process bottleneck by using a throughput analysis. This enriched or augmented model can thus account for the impact of single machines (e.g., faults or failures of a given machine) on the production line level performance (e.g., the system-level performance degradation).

System model 160 can correspond to a portion of a plant topology, and can include three processes with multiple machines or machine models, two buffers, and materials flowing through the machines as part of certain processes. System model 160 can include: a process_1 161 with associated machines or nodes 163 and 166 (e.g., corresponding, respectively, to machine M1-1 143 and machine M1-2 144 of network topology 140); a process_2 173 with associated machines or nodes 174 and 175 (e.g., corresponding, respectively, to machine M2-1 153 and machine M2-2 154 of network topology 140); and a process_3 177 with associated machines or nodes 178 and 179.

Each node can include a machine model. For example, node 163 can include machine models 164 and 165, and node 166 can include machine models 167 and 168. System model 160 can also include: a buffer_1 169 with three distinct holding bins or physical buffers (e.g., 170, 171, and 172); and a buffer_2 176 with three distinct holding bins or physical buffers. A material in (162) can flow into process_1 161 (via a link 121), and can be processed by the machines depicted in nodes 163 or 166. Subsequently, the material can flow to buffer_1 169 (via a link 122). After some period of time spent waiting in this buffer, the material can flow into process_2 173 (via a link 123), and can be processed by the machines depicted in nodes 174 and 175. Subsequently, the material can flow to buffer_2 176 (via a link 124). After some period of time spent waiting in this buffer, the material can flow into process_3 177 (via a link 125), and can be processed by the machines depicted in nodes 178 and 179. Subsequently, the material can flow out of process_3 177 (via a link 126), e.g., logically to another process and associated machine, or physically to a terminus of the production line.

Thus, constructed system model 160 depicts how the machines are connected in the manufacturing system, and that each process may have multiple machines performing similar functions. Furthermore, system model 160 depicts the buffers between each cluster of machines which are part of a process. The system can estimate the buffer size based on the delays between machines. System model 160 can model the operational states of the machines, as each machine can be represented as a finite state machine with states including busy, available, and stopped.

Figure 4:
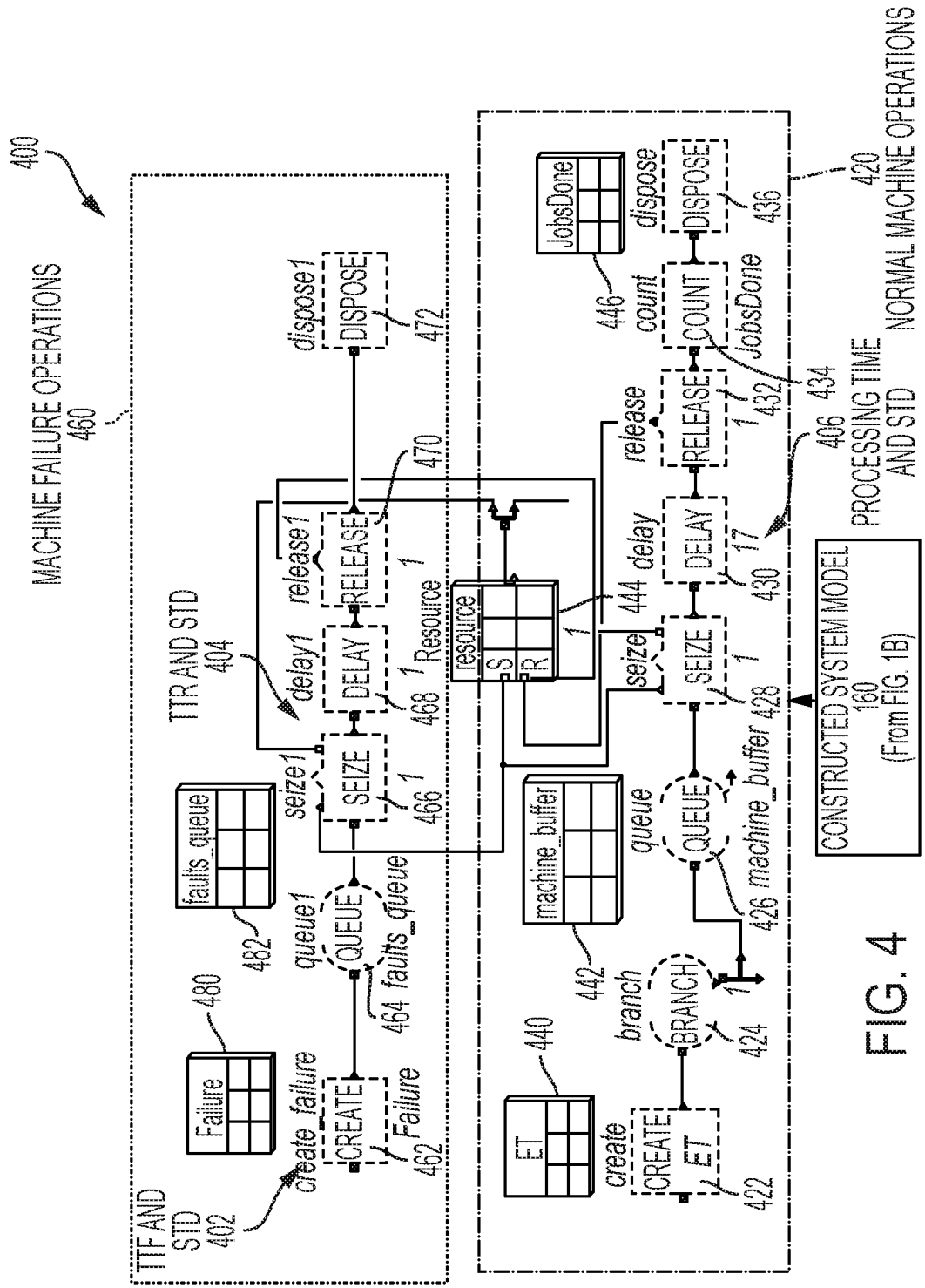
FIG. 4 illustrates an exemplary fault-augmented system model, in accordance with an embodiment of the present application.

FIG. 4 illustrates an exemplary fault-augmented system model 400, in accordance with an embodiment of the present application. Model 400 depicts normal machine operations 420 and machine failure operations 460 which can occur based on the operation of the manufacturing system, and as associated with constructed system model 160 of FIG. 1B. During normal machine operations 420, a create 422 module can represent the start of a job, e.g., an incoming material or part for a given machine. A data structure 440 can monitor the incoming parts to be processed by the given machine. A branch 424 module can indicate a flow from a different machine. A queue 426 can represent an internal buffer zone for the given machine, e.g., a location in which the incoming material or part is to wait until it can be processed by the given machine. A data structure 442 can track the jobs stored in the internal machine buffer, and can include information related to each queued job.

A seize 428 module can indicate that the given machine is free or available to grab the waiting part for processing. A delay 430 module can indicate the time involved for the given machine to process the part (e.g., to cut or weld the part). Based on delay 430, the system can determine a processing time and standard deviation 406 associated with the given machine for the part or material. A release 432 module can indicate that the given machine has released the part and is done processing the part. A resource table 444 can indicate that the given machine is currently being used to process a part (e.g., "S" for a seize 428 operation), and resource table 444 can also indicate that the given machine has finished being used to process the part (e.g., "R" for a release 432 operation).

A count 434 can monitor the overall count of the number of parts processed by the given machine. A dispose 436 module can be connected to a "create" module in the next machine, e.g., the downstream machine/process in the flow for the given part or as part of the corresponding production line for the part. A data structure 446 can track the number of jobs completed by the given machine for a particular part (e.g., storing, maintaining, and tracking count 434).

During machine failure operations 460, a create 462 module can represent the creation of a failure. Based on create 462, a data structure 480 can track the failures and faults experienced by the given machine. Based on create 462 and data structure 480, the system can determine a time to failure (TTF) and a standard deviation 402 associated with the given machine and faults experienced by the given machine.

A queue 464 can represent an internal buffer zone for the given machine which can store faults associated with the given machine. A data structure 482 can track the faults, and can include information related to each queued fault. A seize 466 module can indicate that the fault has taken or "occupied" the resources of the given machine, e.g., not seized by a part as in seize 428 of normal machine operations 420, but instead occupied by a failure or a fault of the given machine, as a "virtual" part. A delay 468 module can indicate the time involved for the given machine to be occupied during the failure or fault. Based on delay 468, the system can determine a time to recover time (TTR) and a standard deviation 404 associated with the given machine and faults experienced by the given machine.

A release 470 module can indicate that the given machine has released the virtual part and is being occupied by the failure, e.g., that the machine has recovered from the fault or failure. A dispose 472 module can indicate that the given machine has returned to a normal machine operation.

Similar to the description of resource table 444 in relation to normal machine operations 420, the system can indicate in resource table 444 that the given machine is currently being used to process a virtual part or is currently unavailable due to a failure or fault (e.g., "S" for a seize 466 operation), and that the given machine has finished being used to process the virtual part, has recovered from the failure or fault, or is again available (e.g., "R" for a release 470 operation).

Thus, system model 400, which depicts normal machine operations 420 and machine failure operations 460, illustrates how a single machine can affect the overall processing of the system. System model 400 allows a user of the system to use the constructed system model 160 and the dynamically determined connections between the machines of the manufacturing system to determine causes of faults in the manufacturing system. Furthermore, system model 400 (based on constructed system model 160) allows a user to simulate how a new configuration of machines would affect the overall processing of the system. If the user wishes to process a new object or material using a different group of machines/processes than indicated by constructed system model 160, the user can gather the models for each machine in the desired new configuration, and run a simulation to determine the performance of the desired new configuration (as described below in relation to FIG. 7). By providing this hybrid approach, the described embodiments can thus address the problem of using a data-driven only approach for a desired new configuration when historical data may not be readily available.

Pruned Causality Graph

Returning to FIG. 1B, causality graph 110, which is generated from the pure data-driven approach, can be dense, especially in a manufacturing system with a large number of combinations of machines and stopcodes. Constructed system model 160 can provide guidance on pruning causality graph 110 in order to obtain a more efficient and usable pruned causality graph 120 (via operations 104 and 106). The system can prune causality graph 110 based on the physical topology of the manufacturing system or on a sensitivity study which uses the system model to identify and analyze the status of key machines in the manufacturing system. The system can prune causality links that do not make physical sense based on the constructed system model.

For example, system model 160 can determine that the machine and stopcode indicated by node 113 of causality graph 110 should be removed in order to obtain a more efficient causality graph (via an operation 106), which results in pruned causality graph 120.

Fault Propagation Rule Generated from Simulation

As described above in relation to FIGS. 2 and 3, the system can categorize the machines and faults into a number of types (e.g., four types) based on the fault parameters for frequency and severity of a respective fault. The system can also simulate a plurality of failure scenarios by changing the one or more fault parameters in the system model, and determining a set of fault propagation rules based on the simulated failure scenarios.

Figure 5A:
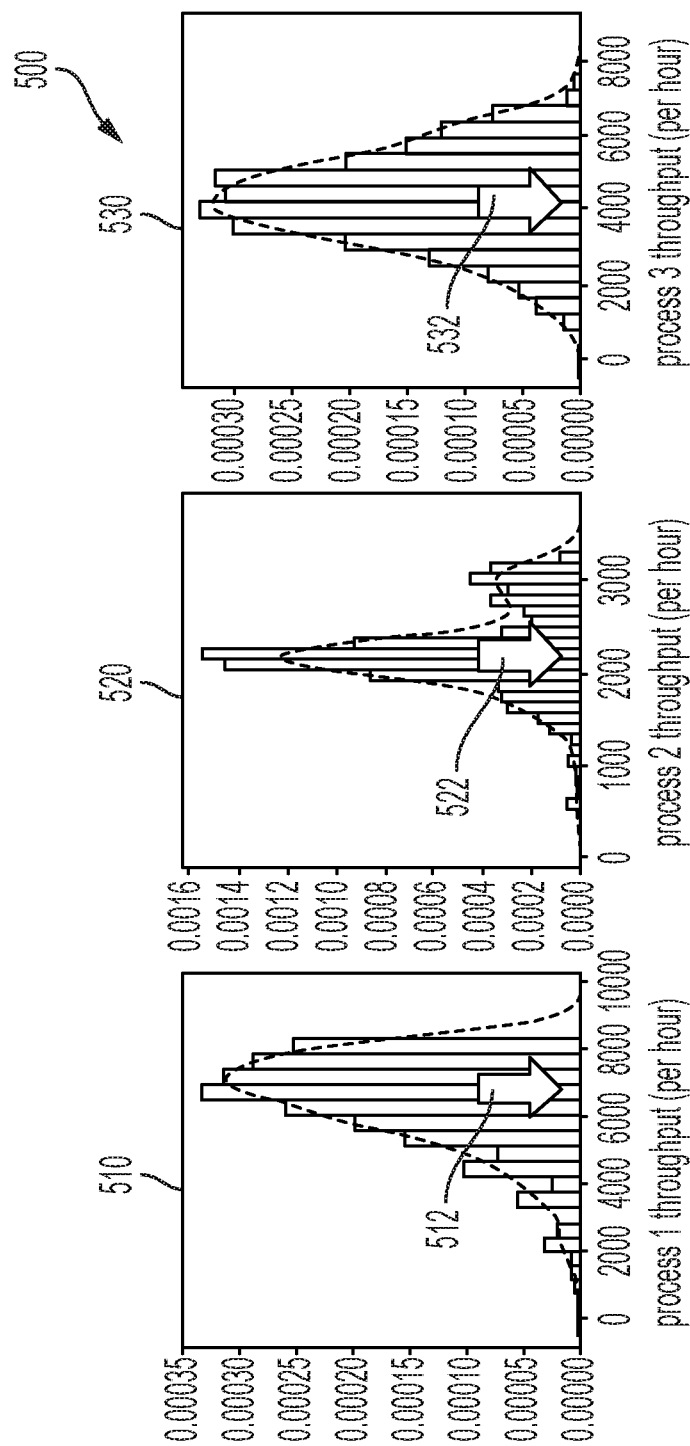
FIG. 5A illustrates exemplary diagrams of throughput and cycle time for three processes, in accordance with an embodiment of the present application.
Figure 5A:
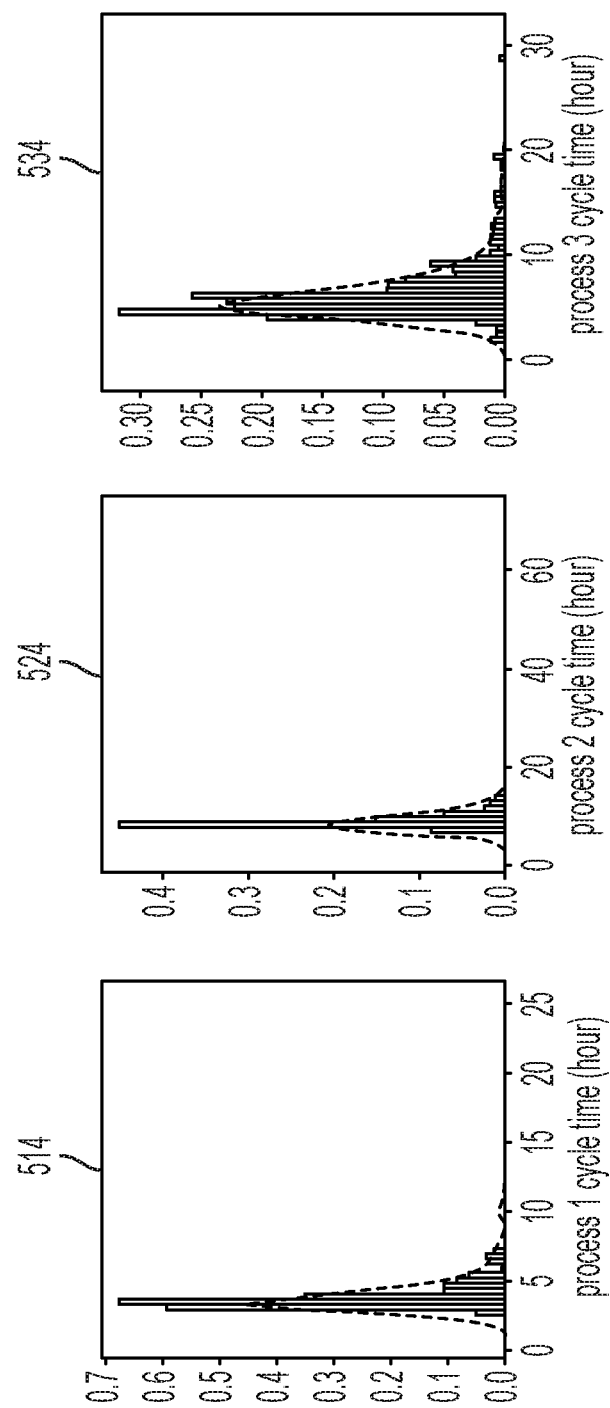

FIG. 5A illustrates exemplary diagrams of throughput and cycle time for three processes, in accordance with an embodiment of the present application. Diagrams 510 and 514 include information relating to a process 1. Diagram 510 can indicate the throughput per hour for process 1, including a peak throughput 512 of ~7,000 units per hour. Diagram 514 can indicate the cycle time per hour for process 1. Diagrams 520 and 524 include information relating to a process 2. Diagram 520 can indicate the throughput per hour for process 2, including a peak throughput 522 of ~2,200 units per hour. Diagram 524 can indicate the cycle time per hour for process 2. Diagrams 530 and 534 include information relating to a process 3. Diagram 530 can indicate the throughput per hour for process 3, including a peak throughput 532 of ~4,000 units per hour. Diagram 534 can indicate the cycle time per hour for process 3.

Thus, the diagrams of FIG. 5A illustrate that the machines in process 2 may create a bottleneck in the overall efficiency of the production line and manufacturing system because of the significantly lower throughput of process 2. That is, the throughput measured in parts per hour for process 2 (2,200 units per hour) is significantly lower than the measured throughput for processes 1 and 3 (respectively, ~7,000 and ~4,000 units per hour). This can indicate that a failure in the machines involved in process 2 may result in a large impact on the overall system. That is, a slight change in the conditions of the identified "bottleneck" machine may result in a large change in the performance of the production line. The diagrams of FIGS. 5B-5E indicate that if similar failures occur in the machines of process 1 or 3, the impact to the overall performance will be less.

Figure 5B:
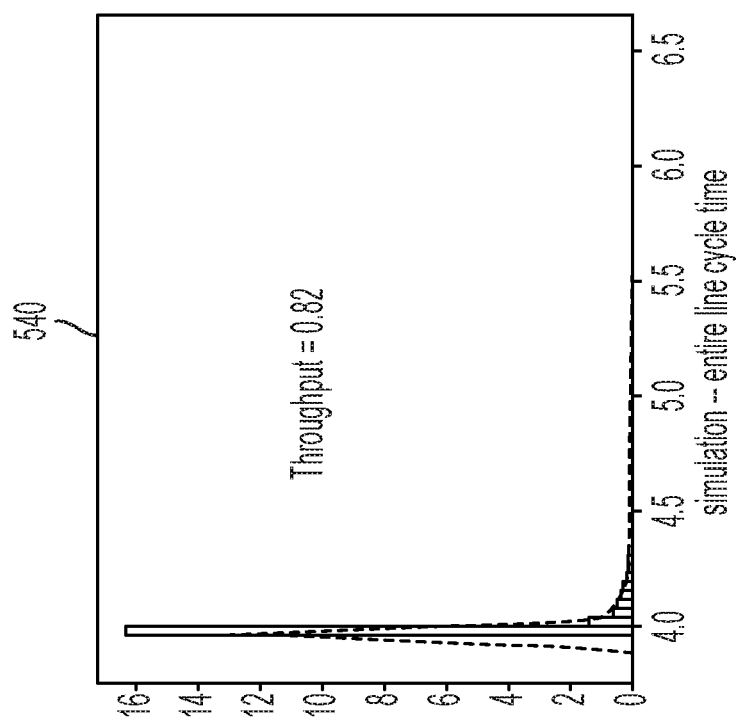
FIG. 5B illustrates an exemplary diagram of a baseline throughput, in accordance with an embodiment of the present application.

FIG. 5B illustrates an exemplary diagram 540 of a baseline throughput, in accordance with an embodiment of the present application. In a simulation over the entire line cycle time, diagram 540 indicates that the baseline throughput is 0.82.

An increase in failures in each of the three exemplary processes can result in different throughputs, with an increase in failures in process 2 resulting in the greatest impact to the throughput.

FIG. 5C illustrates an exemplary diagram 550 of a throughput given an increase in failures of a first process (process 1), in accordance with an embodiment of the present application. Diagram 550 indicates that an increase in failures of process 1 can result in a throughput of 0.67.

FIG. 5D illustrates an exemplary diagram 560 of a throughput given an increase in failures of a second process (process 2), in accordance with an embodiment of the present application. Diagram 560 indicates that an increase in failures of process 2 can result in a throughput of 0.63.

FIG. 5E illustrates an exemplary diagram 570 of a throughput given an increase in failures of a third process (process 3), in accordance with an embodiment of the present application. Diagram 570 indicates that an increase in failures of process 3 can result in a throughput of 0.73.

Thus, FIGS. 5B-5D indicate that "bottleneck" process 2 can result in a throughput of 0.63, while an increase in failures in processes 1 and 3 can result in a throughput of, respectively, 0.67 and 0.73. The system model can generate this fault propagation rule, among others, from the simulations. The system can thus determine a causality relation between failures of the machines and system-level performance degradation.

Figure 6:
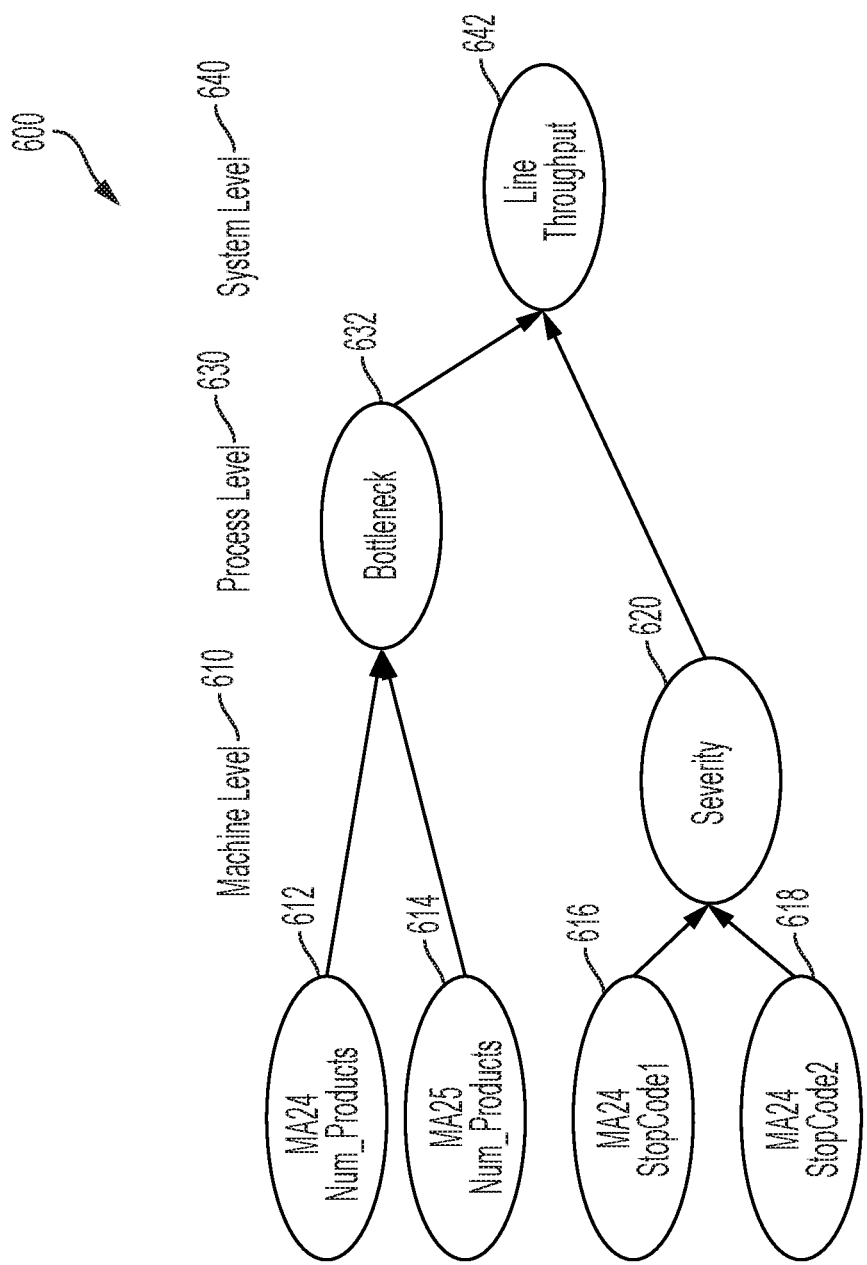
FIG. 6 illustrates an exemplary fault propagation tree based on a manufacturing dataset, in accordance with an embodiment of the present application.

FIG. 6 illustrates an exemplary fault propagation tree 600 based on a manufacturing dataset, in accordance with an embodiment of the present application. Fault propagation tree 600 can include information at a machine level 610, a process level 630, and a system level 640, with nodes which indicates, e.g., machine-status information, product-batch information, stopcodes, fault parameters, and features/characteristics at the machine, process, or system level. The system can determine that the number of products for two machines (e.g., MA24 Num_Products 612 and MA25 Num_Products 614) result in a bottleneck 632. The system can also determine that faults in machines/processes indicated by certain stopcodes (e.g., MA24 StopCode1 616 and MA24 StopCode 2 618) can result in a severity 620. The system can create causal links to bottleneck 632 and severity 620, and can further create a causal link to system-level performance degradation, as seen in a line throughput 642.

Combined Causality Graph

Returning to FIG. 1C, the system can determine a causality relation between failures of the machines and system-level performance degradation. In addition to the exemplary fault propagation tree described above in relation to FIG. 6, the system can generate a fault propagation tree 180 of FIG. 1C (via an operation 108). Fault propagation tree 180 can include a node 181 which indicates "M1 excessive wear." The fault of node 181 can result in a node 182 ("Buffer empty") and a node 184, which indicates a stopcode of "SC j." The empty buffer indicated by node 182 can result in the next machine placed in a fault state of waiting (indicated by a node 183 of "M2 waiting"). Furthermore, the SC j of node 184 can result in a stopcode of "SC k" of a node 185.

Subsequently, the system can add the causality links of fault propagation tree 180 to pruned causality graph 120 to obtain a combined causality graph 130 (via operations 107 and 109). Combined causality graph 130 can include the following new links and nodes to pruned causality graph 120: a link/edge 133 from node 111 (SC 1) to node 114 (SC 4); a link/edge 134 from node 114 (SC 4) to node 115 (SC 5); and a new fault propagation path from node 111 to a new node 131 (SC j) to a new node 132 (SC k). New nodes 131 and 132 can correspond, respectively, to nodes 184 and 185 of fault propagation tree 180.

Thus, combined causality graph 130 demonstrates how the hybrid approach, which includes both the data-driven approach of the upper half of architecture 100 (including causality graph 110, pruned causality graph 120, and combined causality graph 130) and the model-based approach of the lower half of architecture 100 (including network topology 140, constructed system model 160, and fault propagation tree 180), can result in an improved system for determining causes of faults in a manufacturing system. The improvements can include a reduction in the analysis time required to fix a fault, which in turn can result in a reduction in the overall downtime of a single machine and increase in the performance of the production line and the overall manufacturing system.

Figure 7:
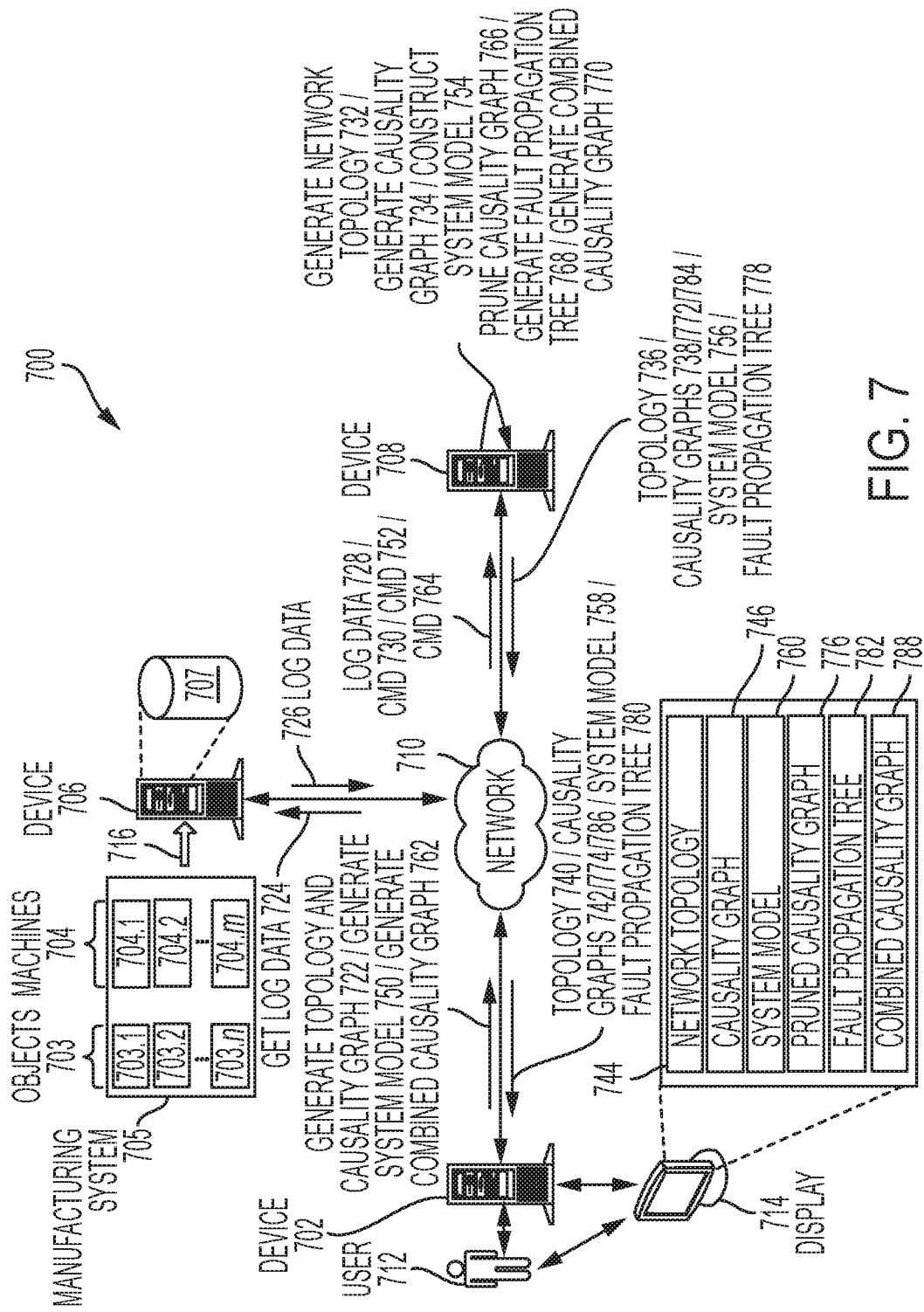
FIG. 7 illustrates an exemplary environment for determining causes of faults in a manufacturing system, in accordance with an embodiment of the present application.

Exemplary Environment for Determining Causes of Faults in a Manufacturing System FIG. 7 illustrates an exemplary environment 700 for determining causes of faults in a manufacturing system, in accordance with an embodiment of the present application. Environment 700 can include: a device 702, an associated user 712, and an associated display 714; a manufacturing system 705; a device 706 and an associated storage device 707; and a device 708. Devices 702, 706, and 708 can communicate with each other via a network 710. Manufacturing system 705 can represent a manufacturing facility or a manufacturing network, and can include materials or objects 703 (e.g., 703.1-703.*n*) and machines 704 (e.g., 704.1-704.*m*). Objects 703 can undergo various processing by machines 704, e.g., as part of specific processes and as depicted herein. This processing can generate log data, which can be stored by device 706 and storage device 707 (via a communication 716). Devices 702, 706, and 708 can be a server, a computing device, or any device which can perform the functions described herein.

During operation, user 712 can determine, via display 714 and device 702, a network topology and a causality graph for manufacturing system 705. Device 702 can send a generate topology and causality graph command 722 to device 708. Device 708 can receive generate topology command 722 (as a command 730). At a subsequent, prior, or similar time, device 706 can send to device 708 (based on a request which triggers a get log data 724 request) log data 726. Device 708 can receive log data 726 (as log data 728), and can transform the received log data to sequence data (not shown).

In response to command 730 to generate the topology and causality graph, device 708 can generate a network topology (operation 732) and generate a causality graph (operation 734). Device 708 can return a topology 736 and a causality graph 738 to device 702. Upon receiving topology 736 (as a topology 740) and causality graph 738 (as a causality graph 742), device 702 can display on display 714 a manufacturing network topology 744 and a causality graph 746. User 712 can use interactive graphical user interface (GUI) elements to manipulate network topology 744 and causality graph 746 (not shown), as described in U.S. patent application Ser. No. 17/061,248.

User 712 can also determine, via display 714 and device 702, a system model for manufacturing system 705 based on the network topology and the causality graph. Device 702 can send a generate system model 750 command to device 708. Device 708 can receive generate system model command 750 (as a command 752). Device 708 can construct the system model (operation 754), and can return a system model 756 to device 702. Upon receiving system model 756 (as a system model 758), device 702 can display on display 714 a system model 760.

User 712 can additionally determine, via display 714 and device 702, a combined causality graph for manufacturing system 705 based on the system model. Device 702 can send a generate combined causality graph 762 command to device 708. Device 708 can receive generate combined causality graph 762 command (as a command 764). Device 708 can prune the causality graph (operation 766) and generate a fault propagation tree (operation 768) based on the system model. Device 708 can also generate a combined causality graph (operation 770). Device 708 can return a pruned causality graph 772, which is received by device 702 as a pruned causality graph 774 and displayed on display 714 as a pruned causality graph 776. Device 708 can also return a fault propagation tree 778, which is received by device 702 as a fault propagation tree 780 and displayed on display 714 as a fault propagation tree 782. Device 708 can also return a combined causality graph 784, which is received by device 702 as a combined causality graph 786 and displayed on display 714 as a combined causality graph 788.

Display 714 can include interactive GUI elements which allow user 712 to manipulate any of the displayed data. The GUI elements can be located on or near each type of displayed data, e.g., 744, 746, 760, 776, 782, and 788. In some embodiments, the user can address any diagnosed or indicated faults, and can generate commands to re-generate any of the displayed data, e.g., by running a simulation to obtain additional information, by reconstructing the system model, or by re-generating the final combined causality graph. The system can display an overlay of the newly generated combined causality graph on the original combined causality graph, and can display other GUI elements which allow the user to view detailed information regarding the differences.

Method for Determining Causes of Faults in a Manufacturing System

Figure 8A:
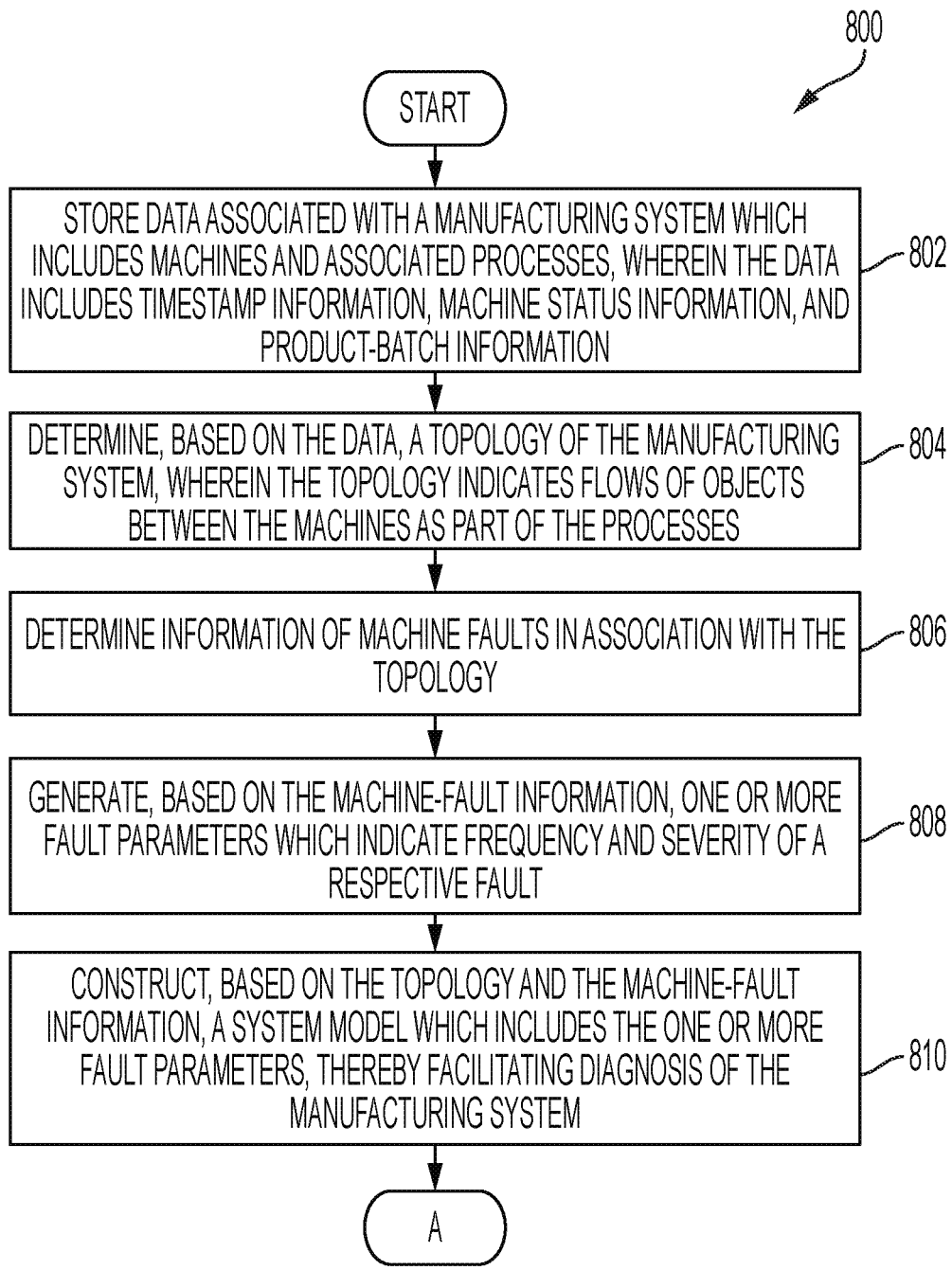
FIG. 8A presents a flow chart illustrating a method for determining causes of faults in a manufacturing system, in accordance with an embodiment of the present application.

FIG. 8A presents a flow chart 800 illustrating a method for determining causes of faults in a manufacturing system, in accordance with an embodiment of the present application. During operation, the system stores data associated with a manufacturing system which includes machines and associated processes, wherein the data includes timestamp information, machine status information, and product-batch information (operation 802). The system determines, based on the data, a topology of the manufacturing system, wherein the topology indicates flows of objects between the machines as part of the processes (operation 804). The system determines information of machine faults in association with the topology (operation 806). The system generates, based on the machine-fault information, one or more fault parameters which indicates frequency and severity of a respective fault (operation 808). The system constructs, based on the topology and the machine-fault information, a system model which includes the one or more fault parameters, thereby facilitating diagnosis of the manufacturing system (operation 810). The system can construct the system model by replacing nodes in the topology with machine models to obtain a fault-augmented model, wherein a respective machine is indicated by a finite state machine with states including busy, available, and stopped. The operation continues at Label A of FIG. 8B.

Figure 8B:
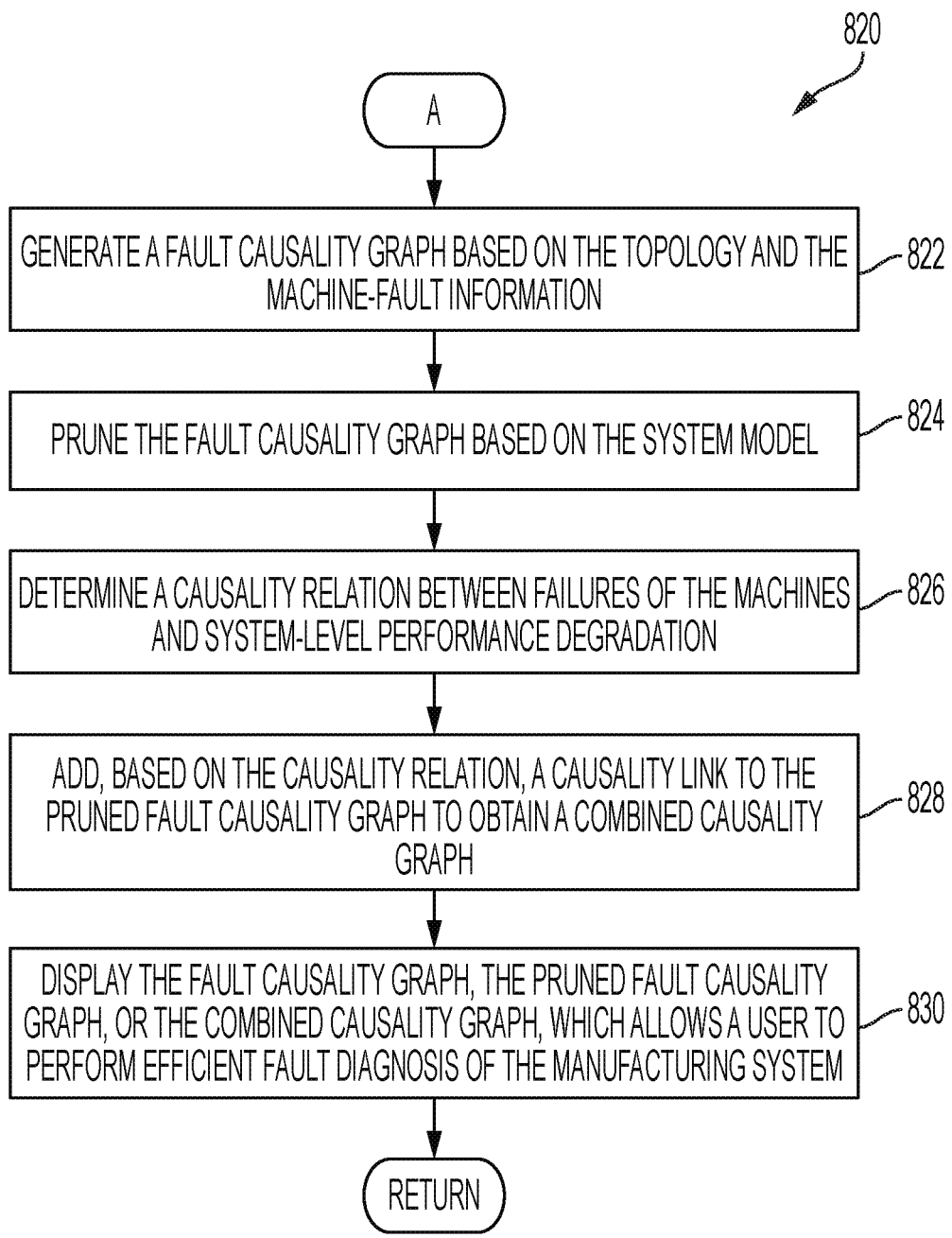
FIG. 8B presents a flow chart illustrating a method for determining causes of faults in a manufacturing system, in accordance with an embodiment of the present application.

FIG. 8B presents a flow chart 820 illustrating a method for determining causes of faults in a manufacturing system, in accordance with an embodiment of the present application. During operation, the system generates a fault causality graph based on the topology and the machine-fault information (operation 822). The system prunes the fault causality graph based on the system model (operation 824). The system determines a causality relation between failures of the machines and system-level performance degradation (operation 826). The system adds, based on the causality relation, a causality link to the pruned fault causality graph to obtain a combined causality graph (operation 828). The system displays the fault causality graph, the pruned fault causality graph, or the combined fault causality graph, which allows a user to perform efficient fault diagnosis of the manufacturing system (operation 830) (e.g., via interactive GUI elements on a display of a computing device associated with the user).

Summary of Application; Integration into a Practical Application; Improvements to Technical Fields In summary, the embodiments described herein provide a system which utilizes a hybrid approach including a data-driven approach and a model-based approach to determine causes of faults in a manufacturing system. The system can be integrated into a practical application because it can efficiently construct a network topology (such as a manufacturing or production line network topology) and causality graphs without requiring intensive computing resources (e.g., installation of additional sensing systems) or focusing on a single component/machine instead of the overall system. The system can generate and display the network topology and the causality graphs.

Moreover, the system can construct a fault-augmented system model from the network topology, prune the causality graph based on the fault-augmented system model, determine machine-fault information based on the network topology, and generate a fault propagation tree based on fault parameters which indicate frequency and severity of a respective fault. The system can use the fault-augmented system model and the fault propagation tree to modify the pruned causality graph to obtain a final combined causality graph. The final combined causality graph can be presented as part of a visual display to a user, which allows the user to more quickly and efficiently interpret and assess the condition of the overall manufacturing system, e.g., allowing for fault diagnosis and root cause analysis via the displayed screen and interactive graphical user elements. Thus, the system can convert a massive amount of repetitive log data into a succinct visualization for quick, efficient, and effective on-site diagnosis.

The graph generation/display described herein can result in a reduction in the analysis time involved in the overall downtime of a component, machine, process, or other equipment of the manufacturing system or in the manufacturing facility. These improvements can result in an improvement in the operation of the machines in the manufacturing system, the performance of a production line, and the overall manufacturing system. The described embodiments can also result in an improvement to the technical and technological fields of manufacturing system analysis, production line monitoring, data analysis, data mining, visualization of machine dependencies, and visualization of fault propagation paths.

Exemplary Distributed Computer System

Figure 9:
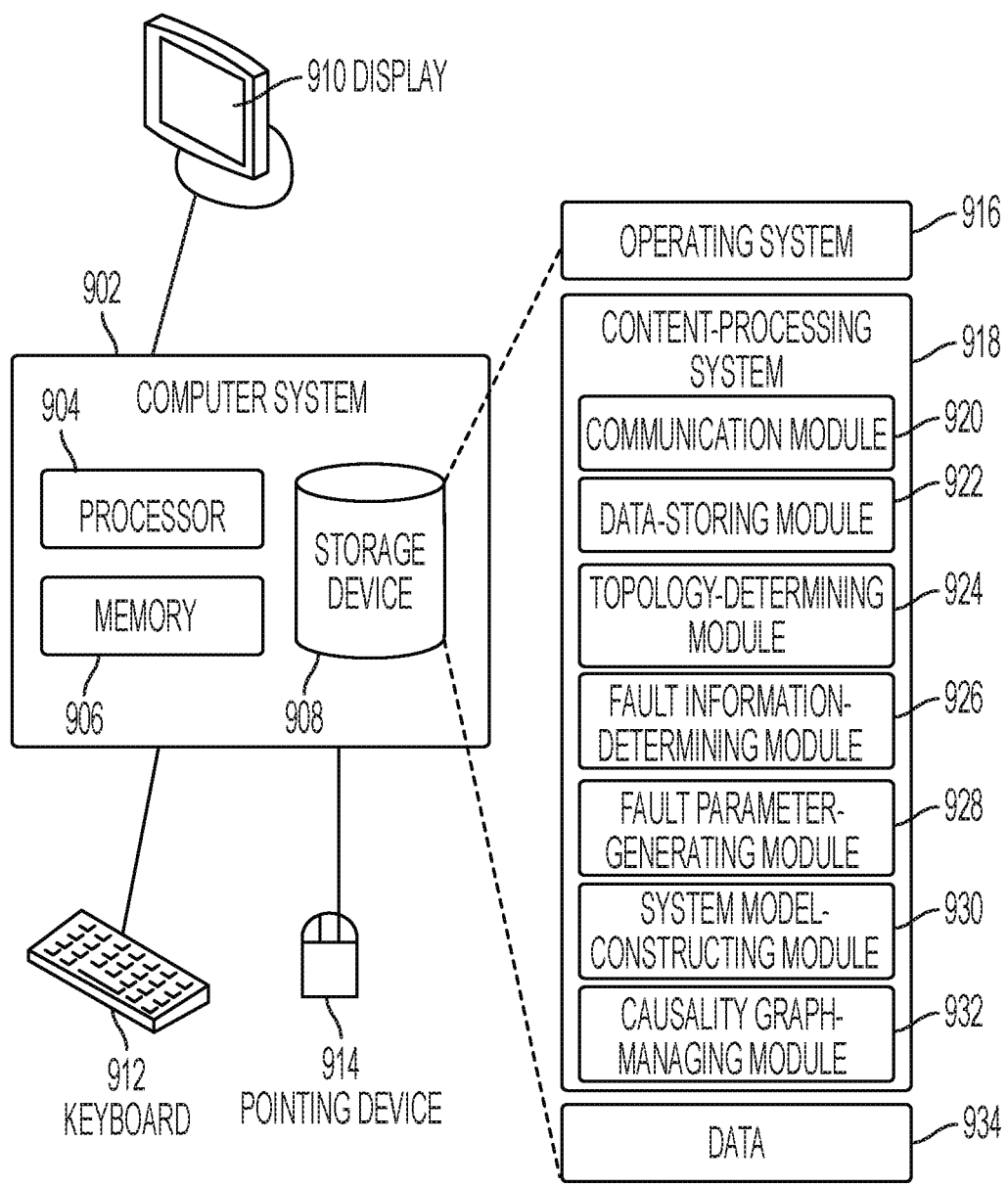
FIG. 9 illustrates an exemplary distributed computer and communication system that facilitates determining causes of faults in a manufacturing system, in accordance with an embodiment of the present application.

FIG. 9 illustrates an exemplary distributed computer and communication system that facilitates determining a manufacturing network topology and fault propagation information, in accordance with an embodiment of the present application. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store an operating system 916, a content-processing system 918, and data 934.

Content-processing system 918 can include instructions, which when executed by computer system 902, can cause computer system 902 to perform methods and/or processes described in this disclosure. Specifically, content-processing system 918 may include instructions for sending and/or receiving/obtaining data packets to/from other network nodes across a computer network (communication module 920). A data packet can include, e.g., a request, a command, data, user input, log data, a topology, paths, a graph, etc.

Content-processing system 918 can further include instructions for storing data associated with a manufacturing system which includes machines and associated processes, wherein the data includes timestamp information, machine status information, and product-batch information (data-storing module 922). Content-processing system 918 can include instructions for determining, based on the data, a topology of the manufacturing system, wherein the topology indicates flows of objects between the machines as part of the processes (topology-determining module 924). Content-processing system 918 can also include instructions for determining information of machine faults in association with the topology (fault information-determining module 926). Content-processing system 918 can include instructions for generating, based on the machine-fault information, one or more fault parameters which indicates frequency and severity of a respective fault (fault parameter-generating module 928). Content-processing system 918 can include instructions for constructing, based on the topology and the machine-fault information, a system model which includes the one or more fault parameters, thereby facilitating diagnosis of the manufacturing system (system model-constructing module 930).

Content-processing system 918 can additionally include instructions for generating a fault causality graph based on the topology and the machine-fault information; pruning the fault causality graph based on the system model; determining a causality relation between failures of the machines and system-level performance degradation; and adding, based on the causality relation, a causality link to the pruned fault causality graph to obtain a combined causality graph (causality graph-managing module 932). Content-processing system 918 can include instructions for displaying the fault causality graph, the pruned fault causality graph, and the combined fault causality graph (causality graph-managing module 932). The modules of content-processing system 918 can also comprise an apparatus with similar modules which can perform the operations and functions described herein.

Data 934 can include any data that is required as input or that is generated as output by the methods and/or processes described in this disclosure. Specifically, data 934 can store at least: data; log data; time series or sequence data; timestamp information; machine status information; machine-fault information; a stopcode or fault type; product-batch information or a lot number; a name or other identifier for an object, output, or a material; a topology; a network topology; a manufacturing network topology and an associated graph; an indicator of a flow of objects or materials between machines as parts of processes; a fault parameter; an indicator of frequency or severity of a fault; a system model; a fault diagnosis; a number; a number of types; a categorization; a failure scenario; a fault propagation rule; a graph; a fault causality graph; a pruned or combined fault causality graph; a causality relation; an indicator of a machine failure or system-level performance degradation; a causality link; a node; an edge; a size of a graph; a mean time between failures; a random event; a breakdown; a distribution; a Gaussian distribution; a standard deviation in a failure; a mean time to recover; a random recovery time; a standard deviation in a recovery; a recovery time; a finite state machine; an indicator of a state including busy, available, and stopped; a normal operation parameter; a process time; a standard deviation in the process time; and a data structure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
storing data associated with a processing system which includes machines and associated processes, wherein the data includes timestamp information, machine status information, and product-batch information;
determining, based on the data, a topology of the processing system, wherein the topology indicates flows of outputs between the machines as part of the processes;
determining information of machine faults in association with the topology;
generating, based on the machine-fault information, one or more fault parameters which indicates frequency and severity of a respective fault;
constructing, based on the topology and the machine-fault information, a system model which includes the one or more fault parameters, thereby facilitating diagnosis of the processing system;
simulating a plurality of failure scenarios by changing the one or more fault parameters in the system model; and
determining a set of fault propagation rules based on the simulated failure scenarios.

2. The method of claim 1, further comprising:
categorizing the machines and the machine faults into a number of types based on the frequency and the severity of a respective machine fault.

3. The method of claim 1, further comprising:
generating a fault causality graph based on the topology and the machine-fault information;
pruning the fault causality graph based on the system model;
determining a causality relation between failures of the machines and system-level performance degradation; and
adding, based on the causality relation, a causality link to the pruned fault causality graph to obtain a combined causality graph.

4. The method of claim 3, further comprising:
displaying the fault causality graph,
wherein a respective node in the fault causality graph indicates, for a respective output, a first machine which processes the respective output, a first process associated with the first machine, and a stopcode indicating an issue associated with the first machine and the first process in processing the respective output, and
wherein a respective edge in the fault causality graph indicates, for the respective output, a logical flow from an originating node to a destination node.

5. The method of claim 4,
wherein pruning the fault causality graph based on the system model comprises reducing a size of the fault causality graph by removing one or more nodes from the fault causality graph, and wherein the method further comprises displaying the pruned fault causality graph.

6. The method of claim 3, further comprising:
in response to adding the causality link to the pruned fault causality graph, displaying the combined causality graph, which allows a user to perform efficient fault diagnosis of the processing system.

7. The method of claim 1, wherein a respective fault parameter includes one or more of:
a mean time between failures, which indicates an average time between two consecutive breakdowns of a respective machine, wherein a respective breakdown is a random event generated from a first distribution;
a first standard deviation in a failure, which indicates a standard deviation of the first distribution which represents the respective breakdown;
a mean time to recover, which indicates an average time for a machine to recover from a stopped state, wherein a random recovery time is generated from a second distribution; and
a second standard deviation in a recovery, which indicates a standard deviation of the second distribution which represents the recovery time.

8. The method of claim 1, wherein constructing the system model which includes the one or more fault parameters comprises:
replacing nodes in the topology with machine models to obtain a fault-augmented model,
wherein a respective machine is indicated by a finite state machine with states including busy, available, and stopped.

9. The method of claim 1, further comprising:
determining, based on the topology, normal operation parameters, including one or more of:
a process time, which indicates a first total time involved for a machine to process a respective output or a second total time involved for all machines in a process to process a respective output;
a standard deviation in the process time; and
a data structure, which indicates the outputs which a respective machine can process.

10. The method of claim 1, wherein the processing system comprises one or more of:
a manufacturing system, wherein the network topology further indicates flows of materials between the machines as part of the processes;
a cloud or cluster computing system, wherein the network topology further indicates flows of distributed or parallel computations or simulations associated with outputs between the machines as part of the processes of the cloud or cluster computing system; and
a supply chain system, wherein the network topology further indicates flows of materials associated with delivery and distribution outputs between the machines as part of the processes of the supply chain system.

11. A computer system, the system comprising:
a processor; and
a storage device storing instructions that when executed by the processor cause the processor to perform a method, the method comprising:
storing data associated with a processing system which includes machines and associated processes, wherein the data includes timestamp information, machine status information, and product-batch information;
determining, based on the data, a topology of the processing system, wherein the topology indicates flows of outputs between the machines as part of the processes;
determining information of machine faults in association with the topology;
generating, based on the machine-fault information, one or more fault parameters which indicates frequency and severity of a respective fault;
constructing, based on the topology and the machine-fault information, a system model which includes the one or more fault parameters, thereby facilitating diagnosis of the processing system;
simulating a plurality of failure scenarios by changing the one or more fault parameters in the system model; and
determining a set of fault propagation rules based on the simulated failure scenarios.

12. The computer system of claim 11, wherein the method further comprises:
categorizing the machines and the machine faults into a number of types based on the frequency and the severity of a respective machine fault.

13. The computer system of claim 11, wherein the method further comprises:
generating a fault causality graph based on the topology and the machine-fault information;
pruning the fault causality graph based on the system model;
determining a causality relation between failures of the machines and system-level performance degradation; and
adding, based on the causality relation, a causality link to the pruned fault causality graph to obtain a combined causality graph.

14. The computer system of claim 13, wherein the method further comprises:
displaying the fault causality graph,
wherein a respective node in the fault causality graph indicates, for a respective output, a first machine which processes the respective output, a first process associated with the first machine, and a stopcode indicating an issue associated with the first machine and the first process in processing the respective output, and
wherein a respective edge in the fault causality graph indicates, for the respective output, a logical flow from an originating node to a destination node.

15. The computer system of claim 14,
wherein pruning the fault causality graph based on the system model comprises reducing a size of the fault causality graph by removing one or more nodes from the fault causality graph, and
wherein the method further comprises:
displaying the pruned fault causality graph; and
in response to adding the causality link to the pruned fault causality graph, displaying the combined causality graph, which allows a user to perform efficient fault diagnosis of the processing system.

16. The computer system of claim 11, wherein a respective fault parameter includes one or more of:
a mean time between failures, which indicates an average time between two consecutive breakdowns of a respective machine, wherein a respective breakdown is a random event generated from a first distribution;
a first standard deviation in a failure, which indicates a standard deviation of the first distribution which represents the respective breakdown;

a mean time to recover, which indicates an average time for a machine to recover from a stopped state, wherein a random recovery time is generated from a second distribution; and a second standard deviation in a recovery, which indicates a standard deviation of the second distribution which represents the recovery time.

17. The computer system of claim 11, wherein constructing the system model which includes the one or more fault parameters comprises:

replacing nodes in the topology with machine models to obtain a fault-augmented model, wherein a respective machine is indicated by a finite state machine with states including busy, available, and stopped.

18. The computer system of claim 11, wherein the method further comprises:

determining, based on the topology, normal operation parameters, including one or more of:

a process time, which indicates a first total time involved for a machine to process a respective output or a second total time involved for all machines in a process to process a respective output;

a standard deviation in the process time; and a data structure, which indicates the outputs which a respective machine can process.

19. The computer system of claim 11, wherein the processing system comprises one or more of:

a manufacturing system, wherein the network topology further indicates flows of materials between the machines as part of the processes;

a cloud or cluster computing system, wherein the network topology further indicates flows of distributed or parallel computations or simulations associated with outputs between the machines as part of the processes of the cloud or cluster computing system; and a supply chain system, wherein the network topology further indicates flows of materials associated with delivery and distribution outputs between the machines as part of the processes of the supply chain system.

20. A non-transitory computer-readable storage medium storing instructions that when executed by a computer cause the computer to perform a method, the method comprising:

storing data associated with a manufacturing system which includes machines and associated processes, wherein the data includes timestamp information, machine status information, and product-batch information;

determining, based on the data, a topology of the manufacturing system, wherein the topology indicates flows of outputs between the machines as part of the processes;

determining information of machine faults in association with the topology;

generating, based on the machine-fault information, one or more fault parameters which indicates frequency and severity of a respective fault;

constructing, based on the topology and the machine-fault information, a system model which includes the one or more fault parameters, thereby facilitating diagnosis of the manufacturing system;

simulating a plurality of failure scenarios by changing the one or more fault parameters in the system model; and determining a set of fault propagation rules based on the simulated failure scenarios.

* * * * *